April 8, 1924.

L. V. ARONSON

ORNAMENT SUPPORT

Filed July 26, 1923

1,489,300

Inventor
Louis V. Aronson,

By Brown & Phelps
Attorney

Patented Apr. 8, 1924.

1,489,300

UNITED STATES PATENT OFFICE.

LOUIS V. ARONSON, OF NEWARK, NEW JERSEY.

ORNAMENT SUPPORT.

Application filed July 26, 1923. Serial No. 654,021.

*To all whom it may concern:*

Be it known that I, LOUIS V. ARONSON, a citizen of the United States, residing at Newark, in the county of Essex and State of New Jersey, have invented certain new and useful Improvements in Ornament Supports, of which the following is a specification.

The invention relates to ornament supports for use upon motor vehicles. Many machines of this class are equipped with heat indicating devices or motor meters attached to the radiator cap or with other instruments or indicating means carried upon the same place. It is often desired to add an ornamental object or "mascot" to the device already present. An object of the present invention is the provision of a readily attachable device to support such ornament or "mascot" upon such existing devices.

An illustrative embodiment of the invention is shown in the accompanying drawing, in which—

Figure 1:
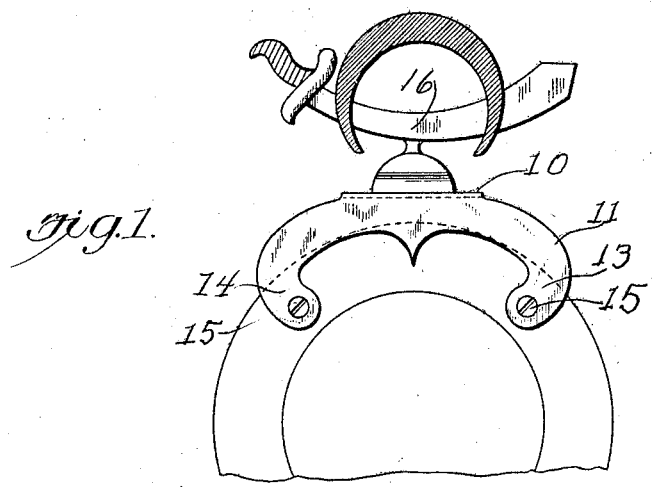
Figure 1 is a front elevation of the device, a detail of the meter being shown.
Figure 2:
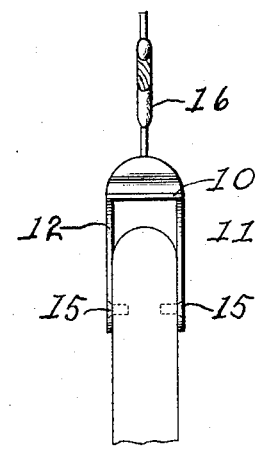
Figure 2 is a side elevation.

As shown, the device comprises a base 10, having plates 11, 12, downwardly extending therefrom. Preferably the base 10 and the plates are formed integral, as a blank stamped from sheet metal, and the plates 11, 12 are bent at their junction with the base 10 to bring them into the proper relation thereto.

The width of the base 10 is substantially that of the device now on the market to which the invention is to be applied. The material from which the device as a whole is formed should be metal having considerable resilience so that the plates 11 and 12 may be swung from their normal position of parallelism to some extent to coact with instruments of slightly greater or less thickness.

The ends 13, 14 of the plates 11 are shown as inturned and perforated for reception of screws 15. The direction of extension and shape of the ends 13, 14 preferably are such as to give a pleasing appearance and to thus enhance the ornamental effect of the device with its supported ornament.

The instruments for which the invention is especially designed are already provided with screws 15, which existing screws may be removed and replaced through the ends 13, 14 of the support. If desired screws of slightly greater length but of the same thread and diameter may be supplied with the device to compensate for the thickness of the plates 11, 12. The base of any desired ornament 16 may be soldered or electrically welded to the base 10 of the device provided by the invention, and the two sold as a unit ready for application to the meter.

Minor changes may be made in the physical embodiment of the invention without departing from its spirit.

I claim:

1. An ornament support comprising a base, a pair of spaced-apart plates extending from said base in substantially parallel relation and at such distance from each other as to adapt said plates to fit snugly over the instrument to which said support is applied and provided with openings for the reception of fastening elements to secure said support and instrument together.

2. An ornament support comprising a base, a pair of spaced-apart plates extending from said base in substantially parallel relation and at such distance from each other as to adapt said plates to fit snugly over the instrument to which said support is applied and terminating in downwardly and inwardly extending ends provided with openings for the reception of fastening elements to secure said support and instrument together.

LOUIS V. ARONSON.